S. BRYANT.
Frying-Pans.

No. 146,312. Patented Jan. 13, 1874.

ATTEST:
H. F. Eberts
H. Sprague

INVENTOR:
Sanford Bryant
per Attorney
Chs. S. Sprague

UNITED STATES PATENT OFFICE.

SANFORD BRYANT, OF DETROIT, MICHIGAN.

IMPROVEMENT IN FRYING-PANS.

Specification forming part of Letters Patent No. 146,312, dated January 13, 1874; application filed July 31, 1873.

*To all whom it may concern:*

Be it known that I, SANFORD BRYANT, of Detroit, in the county of Wayne and State of Michigan, have invented an Improvement in Frying-Pans, of which the following is a specification:

This invention has for its object to furnish a pan for frying meats and other articles of food with an interior perforated pan, which will keep them and the dressing away from the bottom of the pan to prevent their scorching, and to provide a top or cover fitted with a slide, closing a compartment at the top, to contain the crumbs or other dressing, which can be deposited at the proper time upon the meats by simply withdrawing the said slide.

Figure 1:
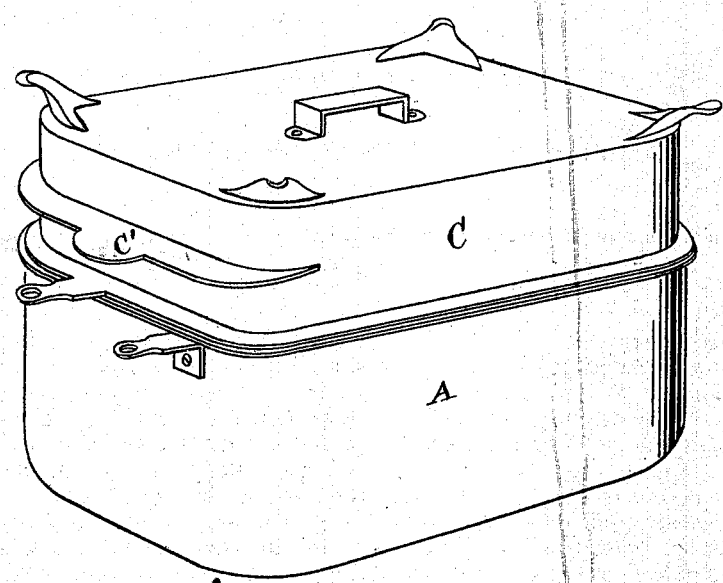
Figure 2:
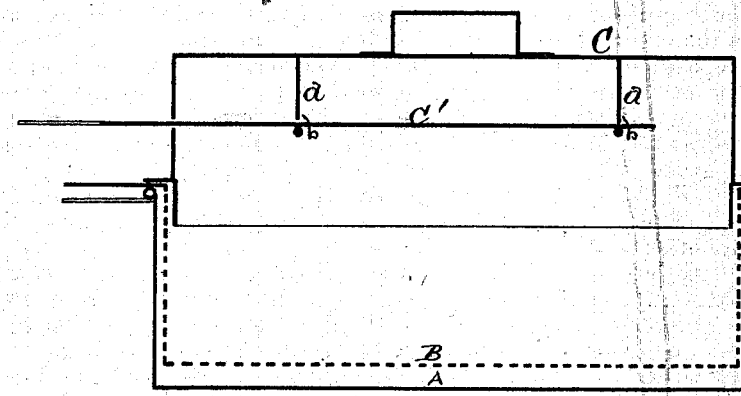
Figure 3:
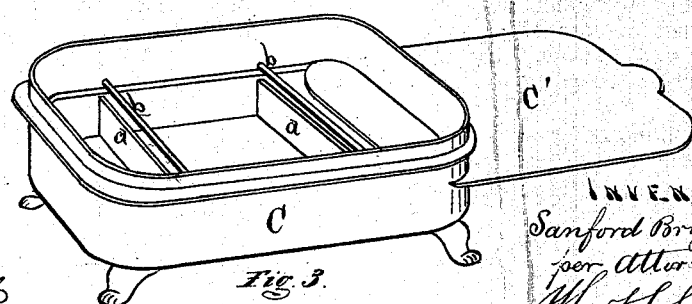

Figure 1 is a perspective view of the pan closed with the cover. Fig. 2 is a longitudinal section of the same. Fig. 3 is a perspective view, showing the interior of the cover.

In the drawing, A represents an ordinary iron dripping-pan, fitted with another one, B, preferably made of perforated sheet metal, which does not extend quite to the bottom, and in which the meats or other articles to be cooked are placed, being kept off the bottom by the inner pan, which prevents them from being burned or scorched, if submitted to the same temperature as the drippings and fatty matters, which, when cooked, constitute the sauce or gravy. C is a deep or chambered cover, whose flange fits closely within the inner pan B, its lower part being fitted with a slide, C′, making a close chamber of the top, which may be subdivided into compartments by transverse partitions $a$, the slide being supported by transverse rods $b$ when closed, which rods have their ends soldered to the sides of the cover. The cover is fitted with a handle, and with feet at the corners, to support it when inverted, when, the slide being withdrawn, the cook places bread-crumbs, powdered crackers, or other dressing in the compartments; the slide is then pushed in and the cover placed upon the pan; when the proper time in the cooking process has arrived, the cook withdraws the slide and deposits the dressing uniformly distributed upon the contents of the pan.

This arrangement saves much time, as the cook is not compelled to stand by the pan and turn over its contents, or stir them about to prevent their burning, and to watch the process after the dressing has been applied.

What I claim as my invention, and desire to secure by Letters Patent, is—

The pan A, fitted with the interior perforated pan B, cover C, and slide C′, substantially as and for the purpose set forth.

SANFORD BRYANT.

Witnesses:
 CHAS. E. HUESTIS,
 H. F. EBERTS.